Nov. 30, 1965    W. B. KNAPP    3,220,743
GRIPPING DEVICE
Filed June 29, 1964
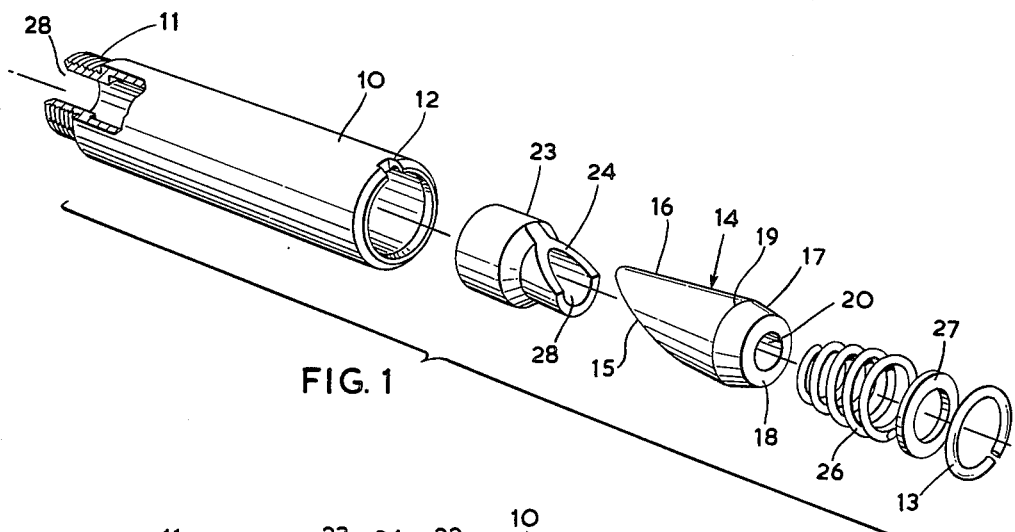
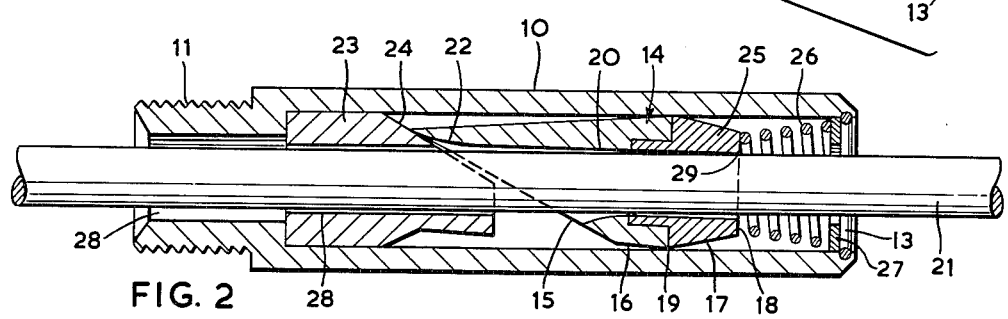
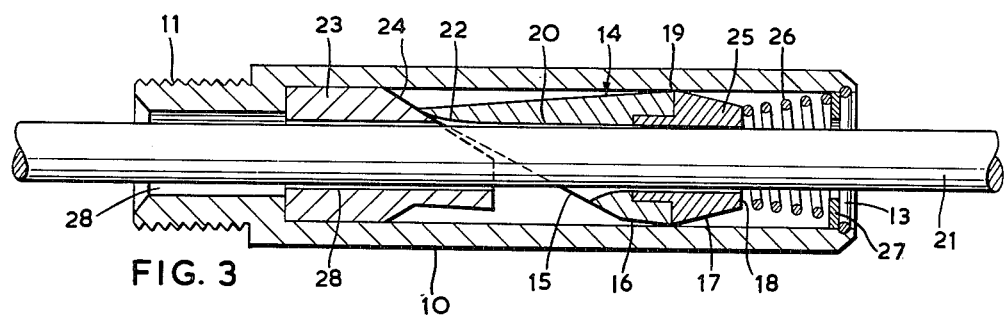
INVENTOR.
WILFRED B. KNAPP
BY
PATENT AGENT

United States Patent Office 3,220,743
Patented Nov. 30, 1965

3,220,743
GRIPPING DEVICE
Wilfred Bernard Knapp, R.R. 2, Prescott, Ontario, Canada
Filed June 29, 1964, Ser. No. 378,831
10 Claims. (Cl. 279—28)

This invention relates to devices for gripping wires, rods, tubes and the like. More particularly, this invention relates to a gripping device designed in such a manner so that when it is moved in one direction relative to a wire or the like, it automatically grips and thereby is capable of moving the wire, but when it is moved in the opposite direction, it automatically releases the wire, so that the device may be slid on the wire.

There are many applications in industry and elsewhere which require the provision of a device that is capable of intermittently feeding a long length of wire or the like to a machine in predetermined amounts. Such a device is required, for example, in connection with wire straightening, cut-off or forming machinery. While devices have been provided in the past that are capable of performing this function, such devices generally are relatively complex in nature and contain a number of moving parts. Furthermore, some these devices actually may damage the wire, tube, rod, etc. being fed by either crimping or gouging it.

In accordance with this invention there is provided a gripping device which contains a minimum number of moving parts and which may be constructed simply and inexpensively. A gripping device embodying this invention also is of such a nature that it will not damage the wire or the like being fed thereby.

In brief, a device embodying this invention includes a housing in which is mounted a gripping member. The gripping member is slideable in the housing in a direction substantially parallel to the longitudinal axis of the housing and also is pivotable in the housing in a plane which passes through the longitudinal axis thereof. The gripping member has an opening passing therethrough which is substantially parallel to the longitudinal axis of the housing and is slightly larger in size than the wire or the like to be gripped by the gripping member. The gripping member also has a face which is inclined at an acute angle to the longitudinal axis of the housing. Withing the housing there also is a second member which has a face also inclined at an acute angle to the longitudinal axis of the housing. This latter face is co-operable with the inclined face of the gripping member to provide a surface on which the inclined face of the gripping member may slide during movement of the gripping member in the housing. Biasing means are provided for biasing the inclined face of the gripping member into engagement with the inclined face of the other member. The housing and other member therein have openings extending therethrough along the longitudinal axis of the housing. These openings are aligned or registerable with the opening in the gripping member to define a passage extending through the device which is adapted to receive a wire, rod, tube or the like.

This invention will become more apparent from the following detailed disclosure, taken in conjunction with the appended drawings, in which, FIGURE 1 is an exploded perspective view of a gripping device embodying this invention, FIGURE 2 is a section through the gripping device of FIGURE 1 when assembled and illustrating how gripping is achieved, and FIGURE 3 is a view similar to FIGURE 2 showing the device in a position where gripping of the wire does not take place and the device is free to slide in one direction on the wire.

Referring to the drawings, there is shown a gripping device including an open-ended housing 10 which is hollow and which is of generally cylindrical configuration. At one end of housing 10 external threads 11 are provided, by means of which any suitable device can be connected to housing 10 to reciprocate the device to the right and left in FIGURES 2 and 3. At the opposite end of housing 10 is a notch 12 which is provided to facilitate removal of a split ring 13.

Positioned within housing 10 is a gripping member 14. Gripping member 14 has a face 15 which is inclined at an acute angle to the longitudinal axis of housing 10, as best shown in FIGURES 2 and 3. The side walls 16 and 17 of gripping member 14 taper outwardly from inclined face 15 and from the end 18 of gripping member 14 opposite inclined face 15 to a part 19 of gripping member 14 that is of larger diameter than any other part of gripping member 14. As best shown in FIGURES 2 and 3, part 19 of gripping member 14 engages the inside walls of housing 10, and by this arrangement gripping member 14 is pivotable in housing 10 about part 19 in a plane passing through the longitudinal axis of housing 10. It should be noted that gripping member 14 does not fit tightly within housing 10 and is capable of sliding movement therein in a direction parallel to the longitudinal axis of housing 10.

Gripping member 14 has an opening 20 therein which is substantially parallel to the longitudinal axis of housing 10 and which is of slightly larger diameter than the wire 21 which is to be gripped and fed by the device. As shown in FIGURES 2 and 3, opening 20 is funnel shaped at 22 adjacent inclined face 15.

Preferably the part of gripping member 14 adjacent end 18 thereof is formed by a tip 25 of extremely hard material such as carbide, for example. This is not essential, but the use of a carbide tip 25 materially increases the useful life of a device embodying this invention.

Also positioned within housing 10 is a member 23 that also has a face 24 inclined at an acute angle to the longitudinal axis of housing 10. Inclined face 24 co-operates with inclined face 15 to provide a surface on which inclined face 15 may slide during movement of gripping member 14 in housing 10. Member 23 may be a separate part, in which event it may be fixed in position in housing 10 by a press fit, for example. Alternatively, member 23 may be formed integral with housing 10.

Biasing means 26 in the form of a compression spring is mounted in housing 10 and is positioned between a washer 27 and end 18 of gripping member 14. Spring 26 biases inclined face 15 into engagement with inclined face 24. Washer 27 is retained in position by split ring 13.

Housing 10 and members 23 each have openings 28 passing therethrough. These openings extend along the longitudinal axis of housing 10 and are aligned or registerable with opening 20 in gripping member 14 so that a passage extends completely through the device to receive wire 21.

The position of gripping member 14 shown in FIGURE 3 is the position thereof when gripping with wire 21 is not being effected. Housing 10 may be moved quite freely to the left in FIGURE 3 and gripping member 14 will freely slide on wire 21. However, when housing 10 is moved to the right from the position thereof in FIGURE 3, gripping member 14 pivots at 19 beneath wire 21 and, under the influence of spring 26, inclined face 15 slides up inclined face 24, so that gripping member 14 tilts to the position thereof shown in FIGURE 2. Under these circumstances opening 20 becomes slightly misaligned with opening 28, and wire gripping member 14 firmly engages wire 21 at 29 (FIGURE 2). Any further movement of housing 10 to the right in FIGURE 2 only increases the force exerted by gripping member 14 on wire 21 at 29, and in this way wire 21 is firmly gripped by the device and can be moved to the right in FIGURE 2 any desired amount. After a predetermined length of wire 21 has been fed, housing 10 may be reciprocated in the opposite direction, which immediately causes gripping member 14 to pivot at 19 above wire 21 and to come out of gripping engagement with wire 21 and assume the position shown in FIGURE 3, so that the device may be moved in the opposite direction to the feed direction and may slide quite freely on wire 21.

Opening 20 preferably is funnel shaped at 22 to facilitate the initial insertion of wire 21 through openings 20 and 28, and in this regard, it will be appreciated that wire 21 must be inserted into the device first through opening 28.

It will be seen that one important feature of a device embodying this invention is that for a "light" feed a light locking action is obtained, whereas for "heavy" feed a heavy locking action is obtained without any adjustment of the device being required, and without any difference in tension on the reverse stroke.

While a preferred embodiment of this invention has been disclosed herein in detail, those skilled in the art will appreciate that changes and modifications may be made therein without departing from the spirit and scope of this invention as defined in the appended claims.

What I claim as my invention is:

1. A device for gripping wires, rods, tubes and the like when moved in one direction with respect thereto, but automatically releasable from gripping engagement therewith when moved in the opposite direction with respect thereto comprising; a housing; a gripping member member mounted in said housing for slidable movement in a direction substantially parallel to the longitudinal axis of said housing and for pivotable movement in a plane passing through said longitudinal axis, said gripping member having an opening passing therethrough substantially parallel to said longitudinal axis and of slightly larger size than a wire, rod, tube or the like to be gripped by said gripping member, said gripping member having a face inclined at an acute angle to said longitudinal axis; said housing having a second member therein having a second face also inclined at an acute angle to said longitudinal axis and cooperable with said face of said gripping member to provide a surface on which said face of said gripping member may slide during movement of said gripping member in said housing; and biasing means for biasing said face of said gripping member into engagement with said second face; said housing and said second member having openings extending therethrough along said longitudinal axis and alignable with the opening in said gripping member to define a passage extending through said device adapted to receive a wire, rod, tube or the like.

2. A device according to claim 1 wherein at least the part of the end of said gripping member remote from said face thereof and around the opening therein is formed of carbide.

3. A device according to claim 1 wherein said biasing means is a spring.

4. A device according to claim 1 wherein the part of the opening in said gripping member adjacent said face of said gripping member is funnel-shaped and funnels into said gripping member.

5. A device according to claim 1 wherein said gripping member is tapered outwardly from said face thereof and from the end thereof remote from said face thereof towards a part of said gripping member intermediate said end and said face of said gripping member, the size of said gripping member being largest at said part thereof and said gripping member being engaged with said housing at said part.

6. A device according to claim 5 wherein said biasing means is a spring.

7. A device according to claim 6 wherein the part of the opening in said gripping member adjacent said face of said gripping member is funnel-shaped and funnels into said gripping member.

8. A device according to claim 7 wherein at least the part of the end of said gripping member remote from said face thereof and around the opening therein is formed of carbide.

9. A device for gripping wires, rods, tubes and the like when moved in one direction with respect thereto, but automatically releasable from gripping engagement therewith when moved in the opposite direction with respect thereto comprising; a hollow, generally cylindrical, open-ended housing, a gripping member mounted in said housing for slidable movement in a direction substantially parallel to the longitudinal axis of said housing and for pivotable movement in a plane passing through said longitudinal axis, said gripping member having an opening passing therethrough substantially parallel to said longitudinal axis and of slightly larger size than a wire, rod, tube or the like to be gripped by said gripping member, said gripping member having a face inclined at an acute angle to said longitudinal axis, said gripping member being tapered outwardly from said face thereof and from the end thereof remote from said face thereof towards a part of said gripping member intermediate said end and said face of said gripping member, the size of said gripping member being largest at said part thereof and said gripping member being engaged with said housing at said part; said housing having a second member therein having a second face also inclined at an acute angle to said longitudinal axis and cooperable with said face of said gripping member to provide a surface on which said face of said gripping member may slide during movement of said gripping member in said housing; a spring positioned within said housing and compressed between a part fixed in position with respect to said housing and the end of said gripping member remote from said inclined face thereof, said spring biasing said inclined face of said gripping member into engagement with said second face; said second member having an opening extending therethrough along said longitudinal axis in alignment with the open ends of said housing and the opening in said gripping member, whereby a passage extends through said device and is adapted to receive a wire, rod, tube or the like.

10. A device according to claim 9 wherein at least the part of the end of said gripping member remote from said face thereof and around the opening therein is formed of carbide, and wherein the part of the opening in said gripping member adjacent said face of said gripping member is funnel-shaped and funnels into said gripping member.

References Cited by the Examiner

UNITED STATES PATENTS

| | | | |
|---|---|---|---|
| 1,754,816 | 4/1930 | Canniff | 294—92 X |
| 2,216,872 | 10/1940 | Baxendale | 279—28 |
| 2,397,749 | 4/1946 | Mendelson | 248—410 |

WILLIAM FELDMAN, *Primary Examiner.*